United States Patent [19]

Jaskowski

[11] Patent Number: 4,617,383
[45] Date of Patent: Oct. 14, 1986

[54] METHOD FOR DEGUMMING AND BLEACHING DECORTICATED PLANT BAST FIBER

[75] Inventor: Michael C. Jaskowski, Pittsburgh, Pa.

[73] Assignee: Helmic, Inc., Pittsburgh, Pa.

[21] Appl. No.: 824,204

[22] Filed: Jan. 30, 1986

Related U.S. Application Data

[63] Continuation-in-part of Ser. No. 668,294, Nov. 5, 1984, Pat. No. 4,568,739, which is a continuation-in-part of Ser. No. 554,256, Nov. 22, 1983, Pat. No. 4,481,355.

[51] Int. Cl.$^4$ .......................... C13L 1/00; D21C 3/00; D01C 1/04
[52] U.S. Cl. ........................................ 536/2; 435/275; 435/277; 435/278; 435/279; 435/917
[58] Field of Search ..................... 536/2; 435/275, 277, 435/278, 279, 917

[56] References Cited

U.S. PATENT DOCUMENTS

| 103,275 | 5/1870 | Allen | 435/277 |
|---|---|---|---|
| 655,599 | 8/1900 | Braunwalder | 169/36 |
| 1,133,590 | 3/1915 | Toles | 435/822 |
| 1,746,316 | 2/1930 | Marcus | 435/822 |
| 1,795,528 | 3/1931 | Watson et al. | 435/277 |
| 1,842,024 | 1/1932 | Hollander et al. | 435/279 |
| 1,941,793 | 1/1934 | Faut | 435/279 |
| 2,407,227 | 9/1946 | Earle | 435/279 |
| 2,725,289 | 11/1955 | Lourd | 435/279 |
| 2,871,163 | 1/1959 | Turnbull | 435/279 |
| 4,481,355 | 11/1984 | Jaskowski | 536/2 |
| 4,568,739 | 2/1986 | Jaskowski | 536/2 |

OTHER PUBLICATIONS

TAPPI, vol. 48, No. 3, Mar. 1965, article entitled "A Method of Degumming and Bleaching Ramie Fibers and Their Physical Properties", by Venkateswaran, at pp. 191-192.

"Cultivation of Ramie in West Bengal, India", Nandi et al., Soil and Crop Science Society of Florida, Proceedings, vol. 24, pp. 418-425, (1964).

"Progress Report on the Chemical Degumming of Ramie by an In-Line, Open-Cook Process", Allison et al., Soil and Crop Science Society of Florida, Proceedings, vol. 22, pp. 176-185 (1962).

Primary Examiner—Ronald W. Griffin
Attorney, Agent, or Firm—Stanley J. Price, Jr.

[57] ABSTRACT

This is a method for degumming decorticated plant bast fiber, such as ramie, flax, or hemp bast fiber, to remove pectin-containing material and coloring gums therefrom. The decorticated plant bast fiber is desirably washed with a washing solution containing a surface active agent to penetrate the plant bast fiber and remove water soluble material and other debris therefrom. The washed plant bast fiber is then rinsed. The washed and rinsed plant bast fiber is treated with an aqueous acidic treatment solution of fungal pectinase for a period of time of between 10 and 30 minutes to remove the pectin from the plant fiber. The acidic treatment solution is maintained at an elevated temperature in the range of between 60° C. and 70° C. and has a pH between about 2.0 and 3.5. Thereafter, the plant bast fiber with the pectin removed therefrom, is removed from the acidic treatment solution and a sufficient amount of NaOH is added thereto to increase the pH of the treatment solution to about 11.0. The plant bast fiber with the pectin removed therefrom is then further treated in the basic solution for a period of time between about 15 to 60 minutes to remove the coloring gum adhering to the plant bast fiber. The plant bast fiber with both the pectin and the coloring gum removed therefrom is then rinsed to remove the treating solution therefrom.

10 Claims, 1 Drawing Figure

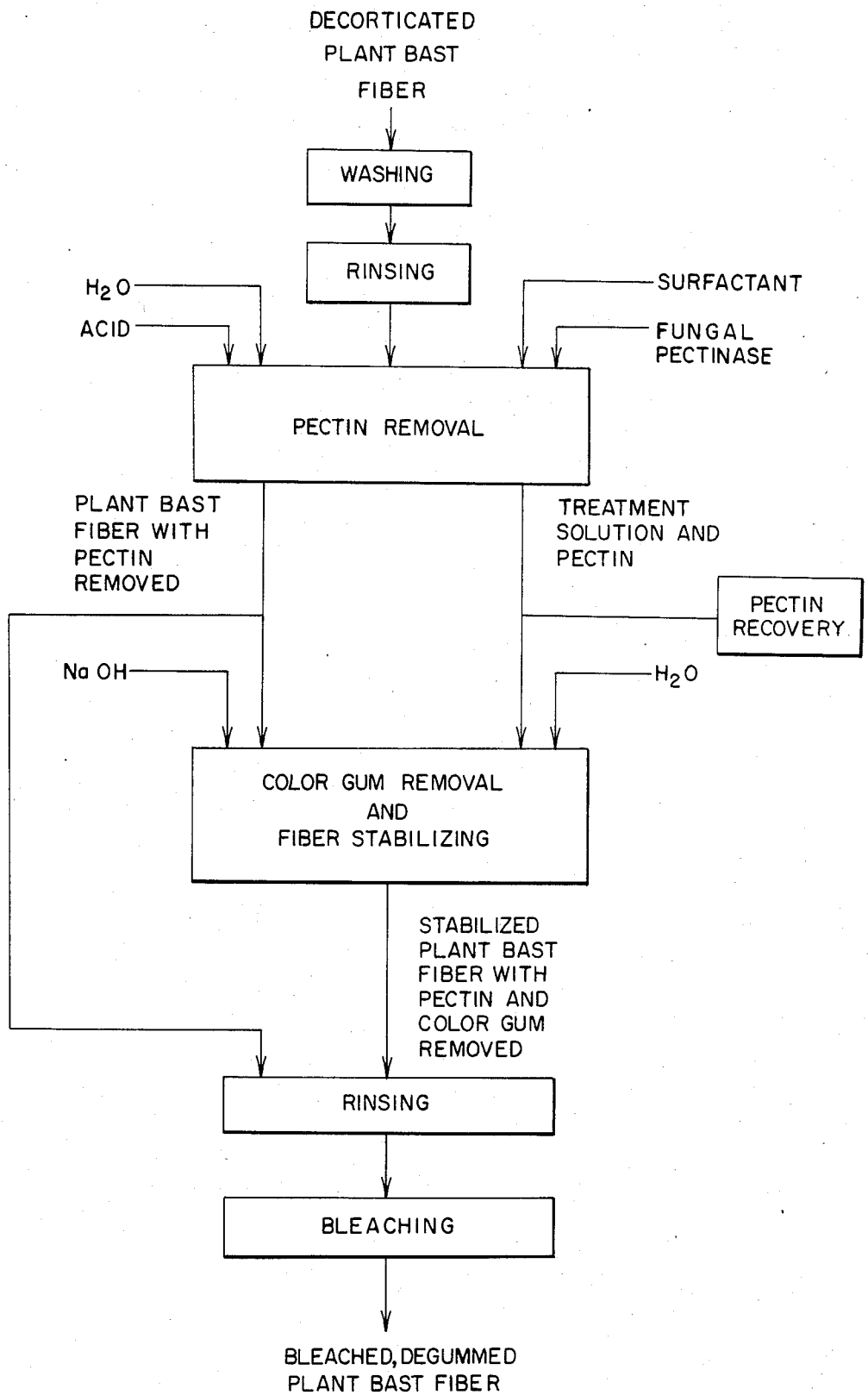

METHOD FOR DEGUMMING AND BLEACHING DECORTICATED PLANT BAST FIBER

CROSS REFERENCE TO RELATED APPLICATIONS

This application is a continuation-in-part of U.S. application Ser. No. 668,294, entitled "Method For Degumming Decorticated Plant Bast Fiber, filed Nov. 5, 1984, now U.S. Pat. No. 4,568,739, which in turn is a continuation-in-part of U.S. application Ser. No. 554,256, entitled "Method for Degumming Decorticated Plant Bast Fiber" filed Nov. 22, 1983, now U.S. Pat. No. 4,481,355, issued on Nov. 6, 1984.

BACKGROUND OF THE INVENTION

1. Field of the Invention

This invention relates to a method for degumming and bleachng decorticated plant bast fiber to remove the pectin containing material and the coloring gums therefrom, and more particularly to a method for degumming decorticated plant bast fiber such as ramie, flax or hemp, to remove the pectin containing material and the other gums surrounding the individual bast fibers and stabilizing the surface of the individual bast fibers.

2. Description of the Prior Art

Most of the major plant bast fibers of the world can be characterized either as stem, or bast, as well as leaf fibers. A bark-like covering surrounds bast fibers and a pectin and other gum containing material surrounds each bast fiber to form an outer sheath. The breaking down and/or removing of a substantial portion of this outer sheath is generally referred to as decortication. Decortication can be accomplished manually, or by known conventional mechanical decorticating apparatus.

A substantial portion of the pectin containing material which surrounds the individual bast fibers is pectin with the remaining portion being primarily various water-soluble constituents. The material surrounding the individual bast fibers also includes a small percentage of other gums which impact a color to the fibers even after the pectin has been removed. Pectin is a polymer similar in chemical structure and behavior to cellulose. Pectin is generally insoluble in water or acid, but may be broken down in an alkaline solution, such as sodium hydroxide.

Removal of the pectin-containing material is necessary for utilization of the fiber for its intended purpose. Where the pectin containing material is to be used as a fiber for cloth, it is desirable to remove the small percentage of gum that imparts a coloring to the fiber. Various methods are known which encompass the degumming or removing the pectin containing substances from the individual bast fiber. For example, U.S. Pat. No. 2,407,227, discloses a retting process for the treatment of fibrous vegetable or plant material, such as flax, ramie and hemp. The retting process includes the separation of the individual fibers from the surrounding plant matter and from each other. The small percentage of gum other than pectin, which remains on the fibers is not completely removed by the bleaching process, nor are the surfaces of the individual fibers stabilized.

U.S. Pat. No. 2,407,227 further discloses a method for the retting of flax and analogous fibers in plant material, as mentioned above, which is carried out in an enzymically-active solution having a mildly acidic pH. This method consists of positively acidifying water to a degree approaching and slightly less than the optimum acid concentration for enzymatic activity. To this solution there is added an amount of enzymically-active solution from a previous ret so as to bring the concentration of acid of the resulting mixture to the optimum value. The mixture is then heated to a temperature which will maximize enzymatic action. The flax or other analogous fiber plant material is then steeped into the mixture which is maintained at a sustained elevated temperature. The fibrous plant material is removed from the mixture when the acid concentration of the solution in which the fibrous plant material is steeped begins to decline. U.S. Pat. No. 2,407,227 further discloses that if decorticated fiber is to be retted, the water can be more highly acidified, even to a pH of 4.0, then heated preferably to a temperature of 90° F. to 95° F. and then mixed with a suitable amount of heated solution from a previous ret. If solution from a previous ret is not available, the solution may be developed through the retting of detached shives, for example. It is further disclosed that retting of decorticated material requires a total time of not more than 24 to 36 hours.

U.S. Pat. No. 2,871,163 discloses a method for the separation of fiber from fiber-containing plants such as jute, kenaf, ramie, flax, sisal, abaca and hemp. A cytase-containing liquor is extracted from plants of the same kind as those for which fiber separation is to be accomplished. The fiber-containing plant portions are crushed, and the crushed portions are treated for a period of one to four days at a temperature between 30° C. and 60° C. with the cytase-containing liquor to decompose the pectin or pectinaceous compounds of the plants to free the fibers therefrom. Disclosed examples of cytases are pectases, pectinase, and protopectinase. The cytases may also be found in certain fruits, vegetables, various fungi and bacteria; and cytases obtained from these sources may be used. It is further disclosed that it is advantageous to maintain the pH of the extracted cytase-containing liquor at between 6 and 8, perferably below 7.

U.S. Pat. No. 2,725,289 discloses a process for the chemical retting or ramie, flax, hemp, jute, and the like. The fibrous material is subjected to a first treatment by an aqueous solution having an alkali base containing a palmitate of an amine base which functions as an emulsifier; and then to a second treatment with an aqueous solution which includes the same substances as that in the first treatment and additionally contains an oxidizing agent.

U.S. Pat. No. 1,941,793 discloses a retting process of textile materials. A special compound is added to the retting water. The special compound is composed of saponified fatty stuffs to which are added, in certain proportions, salts from strong bases and weak acid. These saponified fatty substances divide and dissolve in the retting water providing a coating to protect the fibers from the action of the free nascent alkali liberated in the incompletely saturated medium.

U.S. Pat. No. 1,842,024 discloses a process for retting fibers in which a cellulose fiber is surrounded by a cortex of ligneous material, such as flax, ramie, jute, sisal, hemp, etc. An enzyme capable of digesting a cortex of ligneous material surrounding a cellulose fiber is added to the retting bath. Suitable disclosed enzymes include enzymes prepared from fungi, such a species of aspergillus. It is disclosed that best results are obtained in a bath having a pH value of from 5 to 8 with an optimum pH value being about 7. The pH value of the enzyme bath is regulated by the addition of acids, such as acetic acid and sulfuric acid, and the duration of the enzyme step can vary, but generally will be between 24 and 48 hours.

As disclosed in U.S. Pat. No. 1,941,793, the fibers are first subjected to an alkaline bath and are then subjected to the enzyme bath. The chemical alkaline bath serves to open the cortex of ligneous material to make the cortex more accessible to the action of the enzyme bath. A buffer is preferably added to the chemical alkaline bath to protect the cellulose fibers from the action of the alkaline liquid.

U.S. Pat. No. 1,795,528 discloses a process of producing fiber and yarn from flax. In the process, the fibers are eventually twisted into a rove. The rove is wound onto an open reel and retted bacteriologically to soften the gummy matter associated with the fibers.

U.S. Pat. No. 1,746,316 discloses a process for retting textile fibers, such as flax, jute, and ramie. In the method, a nitrogen fixing bacteria is added to the retting process to degum the gum or pectin from the fiber.

U.S. Pat. No. 1,133,590 discloses a method and apparatus for retting fibrous materials. A specific ferment is added to the retting fluid and acts as a natural solvent of the gummy substances and hastens the removal of the gummy substances from the fiber. This ferment is a specific pectin ferment which hastens the propagation of the retting bacteria.

U.S. Pat. No. 103,275 discloses a process for loosening or separating long-line fiber, such as ramie fiber, from its hard woody stalk by means of a fermenting bath.

U.S. Pat. No. 655,599 discloses a method of treating raw and worked textile fibers, such as jute, hemp and ramie. Glycerin is added to a fermenting bath to promote the growth of an effective organized ferment. The organized ferment has the effect of dissolving the gummy material in the fibers and loosening the bundles of cells. The core of the cell, however, is left intact.

In an article entitled "A Method Of Degumming and Bleaching Ramie Fibers and Their Physical Properties" by Venkateswaran appearing in "Tappi", Volume 48, no. 3, (March, 1965), two procedures for degumming ramie fibers are disclosed. The first procedure includes an ethyl alcohol extraction of the fiber for a 2 to 4 hour period and a treatment of the fiber for a period of two hours with a boiling sodium hydroxide solution. In the second procedure, the ramie fibers were soaked in ethanol overnight; and the ethanol-treated fibers were washed with deionized water.

In an article entitled "Cultivation of Ramie in West Bengal, India" by Nandi et al., Soil and Crop Science Society of Florida, Proceedings, Volume 24, pp. 418–425, (1964), it is disclosed that degumming of ramie fiber is accomplished by alkali treatments by boiling in large open pans and can also be carried on by microbiological retting.

In the article "Progress Report on the Chemical Degumming of Ramie by an In-line, Open-cook Process" by Allison et al., Soil and Crop Science Society of Florida, Proceedings, Volume 22, pp. 176–185 (1962), an in-line degumming apparatus for degumming ramie fiber by moving the fiber through the apparatus through a degumming solution is disclosed. The contents of the degumming solution are apparently not disclosed in this article; and the article mentions that such in-line apparatus can accomplish the degumming in from about 7 to 10 minutes. However, this article notes that the denier, or the weight, in grams, of a fiber 9,000 meters in length, is consistently higher when compared with conventionally known pressure degumming systems by a factor as much as 1.5 to 2.0 units or more. The article indicates that the higher denier suggest something is remaining in the fiber degummed by such in-line apparatus. The article concludes that the actual usefulness of ramie fiber coming from the in-line method of degumming was still, at the time of the writing of the article, to be proven at the industrial level.

While processes are known for degumming plant bast fiber, such as ramie, flax and hemp, the known processes require a considerable amount of time, may degrade the fiber, or may leave various impurities with the fiber which may not be desirable in certain applications or uses for the fiber. Therefore, there is a need for a method of degumming plant bast fiber, such as ramie, flax and hemp bast fiber, that can effectively degum the fiber in a substantially short period of time, remove the small percentage of coloring gums and provide a high quality product that is at least equal to or superior to that obtainable by conventional degumming methods.

SUMMARY OF THE INVENTION

In accordance with the present invention, there is provided a method for degumming decorticated plant bast fiber, such as ramie, flax or hemp bast fiber, to remove pectin-containing material and the coloring gums therefrom. In the method, the decorticated plant bast fiber is treated with an aqueous, acidic solution containing a surface active agent to penetrate the plant bast fibers and remove the water soluble material and a fungal pectinase to remove the pectin from the plant bast fiber. The treatment solution is preferably maintained at a temperature of between about 60° C. and 70° C. and the solution has a pH of between about 2.0 and 3.5. The plant bast fibers are immersed in the solution for a period of between 15 and 30 minutes.

Thereafter, the plant bast fibers are removed from the solution and sodium hydroxide is added to the solution in an amount of about 0.3% sodium hydroxide in the total solution. The pH of the solution is elevated to about 11 and the plant bast fibers are immersed in the solution for a period of between 15 and 60 minutes at a temperature of about 160° F. The treatment with the sodium hydroxide solution removes the coloring gums from the fibers and further fixes or stabilizes the surface of the individual fibers.

The degummed plant bast fibers are then separated from the sodium hydroxide solution and rinsed in water at a temperature of between 100° F. to 120° F.

The present invention further provides a method for bleaching the degummed plant bast fibers by immersing the fibers in a warm chlorine bleach solution for approximately one minute or until the desired bleach or whiteness is obtained. A suitable bleaching solution contains 0.3% NaOCl. The bleached degummed plant bast fiber is then rinsed and dried in any suitable manner.

Should it be desired to recover the pectin from the solution prior to removing the coloring gum the degummed plant bast fibers are removed from the acidic solution containing the pectin and the pectin can be recovered from the solution in a suitable manner.

Accordingly, the principal object of the present invention is to provide an efficient and rapid method for degumming plant bast fiber, such as ramie, flax or hemp bast fiber, and also the coloring gums therefrom.

Another object of the present invention is to provide a method for degumming plant bast fiber in which the degummed plant bast fiber has an acceptable whiteness for further processing.

These and other objects of the present invention will be more completely disclosed and described in the following specification, the accompanying drawing, and the appended claims.

BRIEF DESCRIPTION OF THE DRAWING

The drawing is a flow diagram illustrating the method of removing the pectin-containing material and the coloring gums in plant bast fibers in accordance with the present invention.

DESCRIPTION OF THE PREFERRED EMBODIMENTS

Referring to the drawing, there is diagramatically illustrated a method for degumming decorticated plant bast fiber, such as ramie, flax or hemp bast fiber, in which the decorticated plant bast fiber, if necessary, is first washed in a suitable washing solution that contains a surface active agent to penetrate the plant bast fiber to remove water soluble material and any foreign matter or debris from the pectin-containing material surrounding the plant bast fiber.

The decorticated plant bast fiber may be washed in a conventional may be washed in conventional washing apparatus and a suitable agitator may be used to agitate the plant bast fiber in the solution. Where desired, intake and discharge conduits are connected to or in communication with the container for adding or removing liquid from the container. Suitable pumping means may be provided to convey the make-up liquid to and from the container. An example of a suitable, conventional washing apparatus is a commercial washing machine.

The washing solution is added to the washing apparatus and the decorticated plant fiber is immersed in the solution. The decorticated plant bast fiber is agitated in the washing solution to promote penetration of the plant fibers to remove the water soluble material.

In this method, any of a number of commercially available surface active agents which function as a penetrant can be used. It is preferred however that the surface active agents or surfactants be non-ionic and not attached to the fibers. There are a number of commercially available surface active agents or surfactants which function as a penetrant. TRITON X-100, which includes an alkyl phenoxy polyethoxy ethanol, manufactured and sold by Roman Hass, is suitable. Also, non-ionic surfactant, manufactured by Union Carbide, sold under the trademark "TERGITOL" is also suitable.

Commercially available detergents containing a surface active agent which functions as a penetrant can also be used. An example of a surface active agent found in commercial detergents, is alki aryl sulfonate. As stated, it is preferred that the surfactant or surface active agent be a non-ionic surfactant.

The time required for washing the decorticated plant bast fiber with the washing solution is dependent upon the initial condition of the plant bast fiber. The washing time is generally between 2 minutes up to about 15 minutes on the average considering the initial condition of the decorticated plant bast fiber. Washing from about 5 to about 15 minutes is generally preferred. The water soluble material removed in the washing step accounts for up to about 5% of the pectin-containing material which surrounds the plant bast fiber. It is preferred that the washing take place in a warm aqueous washing solution. The temperature of the solution should be about 160° F., which is the temperature range normally used with most commercial washing machines. The amount of surface active agent or surfactant may vary depending upon various factors such as the initial condition of the decorticated plant bast fibers.

The washed plant bast fiber is then rinsed to remove any water soluble material which may still be adhering to the pectin-containing material surrounding the plant bast fiber. As well as to substantially prevent redeposition of the removed, water soluble material onto the plant bast fiber. Rinsing is accomplished, for example, in the previously described commercial washing apparatus by agitation of the plant bast fiber in the rinsing liquid in the washing apparatus. Rinsing by other suitable means such as by spraying a sufficient quantity of rinsing agent on the washed plant bast, can also be employed. A suitable rinsing agent is used. Water is generally preferred as the rinsing agent for accomplishing the rinsing of the plant bast fiber. Either cold or warm water may be used for rinsing the plant bast fiber.

The number of rinses required and the time for rinsing varies, depending upon the initial condition of the decorticated plant bast fiber. Generally, a single rinse is sufficient. The rinse can be a spin rinse performed in conventional washing apparatus, which may also include a spraying device for spraying the rinse water onto the plant fiber as the holder is rotated. A visual inspection of the rinse plant bast fiber is helpful in determining if additional rinsing is necessary.

The washed and rinsed plant bast fiber is then treated with an aqeous acidic treatment solution of fungal pectinase for a preferable period of between 10 to 30 minutes to degum the plant bast fiber thereby removing the pectin therefrom. This treatment solution is maintained at a temperature of between about 60° C. to 65° C. during the treatment of the plant bast fiber. The treatment solution preferably has a pH of between 2.0 and 3.5 and most preferably a pH of about 2.5. However, the pH can extend to an upper limit of 4.5 and the treatment time can extend up to about 1 hour.

The treatment solution initially is acidified to bring the pH to about 3.0 to 2.5 by using various commercially available acids. Examples of suitable acids are hydrochloric acid, sulfuric acid, phosphoric acid, and glacial acetic acid. Hydrochloric acid is preferred. The amount of acid required to achieve a pH value within the above range is dependent on the amount of the water used in the treatment and the concentration of the acid. For example, it is preferable that the treatment solution have a pH of about 2.5.

The fungal pectinase added to the acidified aqueous solution desirably is an allomelanin and, preferably, the fungal pectinase employed is an allomelanin obtained from any source of aspergillus niger. An example of a suitable source for the fungal pectinase is "Pectinase, Tech. Powder (Fungal)", available from ICN Nuitritional Biochemicals. About one gram to about 25 grams of fungal pectinase is added to between 30 and 45 gallons of treatment solution, containing about 10,000 grams of plant bast fiber. An equivalent relationship of fungal pectinase to plant bast fiber by volume of treatment solution is used for incremental amounts of less than 10,000 grams of plant bast fiber. For example, for 5,000 grams of plant bast fiber, about 0.5 grams to about 12.5 grams of fungal pectinase is needed and a volume of treatment solution of about 15 to about 22.5 gallons is used.

The amount of pectinase used in the solution is dependent on the origin of the plant where there are different percentages of pectin on the plant. Pectin can range from 5 to 25% in the gums. It is, therefore, desirable to include an excess of the fungal pectinase so that substantially all of the pectin is removed from the plant bast fiber.

It is believed that one gram of fungal pectinase will remove 1,500 grams of pectin at the pH of the solution above discussed. If one were treating, for example, 1,000 grams of plant bast fibers, that contained an average of 15% by weight pectin, the 150 grams of pectin could be removed by using 0.1 gram of pectinase. Because the average pectin in the plant varies, it is desirable, however, to use a substantial excess of fungal pectinase to react with the pectin and remove all of pectin from the plant bast fibers.

The aqeous acidic fungal pectinase solution is maintained at an elevated temperature of about 160° F. for the treatment of the washed plant bast fiber. The elevated temperature promotes a faster reaction rate for degumming the plant bast fiber. Generally, at lower temperatures, the degumming reaction proceeds at a slower rate than at more elevated temperatures. The reaction temperature range is generally selected so as to promote maximum enzymatic activity and thereby maximize the degumming rate of the plant bast fiber. The temperature can range between 38° C. to about 70° C. (100° F. to about 160° F.) with a preferred range being about 60° C. to 71° C. (about 150° F. to about 160° F.).

It should be understood that the specific temperature is not critical and the above temperatures preferred. If the treatment solution is maintained at too high a temperature, the enzyme will not function efficiently, or, depending on the temperature, the enzyme may be destroyed. Therefore, the elevated temperature range at which the treatment solution is maintained is largely dependent on the fungal pectinase enzyme. Further, if the treatment solution is maintained at too high a temperature, the acid in the treatment solution increases in activity, thereby raising the potential for degradation of the plant bast fiber by acid hydrolysis.

A preferred range for a fungal pectinase which is an allomelanin obtained from a source of aspergillus niger is generally around 60° C. to 70° C. or about 150° F. for a solution having a pH in the range of between 2.0 and 4.5. Additionally, a small amount of a non-ionic penetrant, such as TRITON X-100 is preferably added to the solution to hasten the penetration of the fungal pectinase enzyme into the pectin in the pectin-containing material surrounding the plant bast fiber. It has been found that 0.013% by weight of the penetrant or surfactant TRITON X-100 in the solution is suitable.

The washed and rinsed plant bast fiber is treated with the aqueous acidic treatment solution of fungal pectinase for a period of time, preferably between about 10 to 30 minutes. The length of treatment varies with percentage of the pectin on the fiber. A shorter treatment being required with less pectin present. If the decorticated plant bast fiber remains in the treatment solution for longer that about one hour, acid hydrolosis causes significant degradation of the plant bast fiber, which is primarily cellulose. The acidic nature of the treatment solution, having a pH of between 2.0 to 4.5 promotes the acid hydrolysis.

Preferably the plant bast fiber should be treated in the treatment solution for about 10 to 30 minutes, especially if the treatment solution has a pH value between about 2.0 and about 3.5. Most preferably, the treatment solution has a pH value of about 2.5 and is maintained at a temperature of from about 60° C. to about 70° C. The solution also, most preferably, includes fungal pectinase, obtained by a source of aspergillus niger.

The treatment of the plant bast fiber in the aqueous acidic solution of fungal pectinase may be carried out using conventional apparatus, such as a conventional washing machine as previously described herein. A suitable way of treating the plant bast fiber with the treatment solution, is to place the plant bast fiber in the treatment solution in the conventional washing machine and agitate the plant bast fiber in the treatment solution for the requisite period of time.

After the degummed plant bast fiber has been treated with the treating solution containing the pectinase, if the end use of the plant bast fiber is such that the small percentage of coloring resin or gum may remain, the degummed plant bast fiber should be promptly rinsed to prevent degradation by acid hydrolosis. The rinsing is intended to remove any residual acidic constituents remaining in contact therewith, as well as substantially preventing redeposition of any pectin on the plant bast fiber.

Rinsing of the degummed plant bast fiber is accomplished preferably within about one hour after the completion of the treatment of the plant bast fiber in the aqueous acidic treatment solution of fungal pectin. Prompt rinsing significantly minimizes loss in fiber and in fiber strength. Preferably, the degummed plant bast fiber is immediately rinsed after being treated with the treatment solution.

Rinsing should take place for a sufficient time to insure that substantially none of the acidic constituents and substantially none of the removed pectin are in contact with the degummed plant bast fiber. Usually, the rinsing time using a sufficient quantity of water is at least about 2 minutes. The degummed plant bast fiber can be rinsed in a conventional washing apparatus, such as a washing machine as previously described herein. Cold or warm rinse water may be employed for rinsing the degummed plant bast fiber.

Unlike certain known process for degumming plant bast fiber which use an alkali solution containing sodium hydroxide, the pectin removed from the plant bast fiber in the method of the present invention is not broken down. The pectin can be separated from the aqueous, acidic treatment solution of fungal pectinase by known separating methods, pectin being generally insoluble in water or acids. The pectin, so separated can be appropriately purified, if desired, and used or sold for various applications.

If the residual acidic constituents are not effectively rinsed, then the degummed plant bast fiber remains in contact with the residual acidic constituents. Consequently, degradation of the degummed plant bast fiber occurs by acid hydrolysis, as well as, by redeposition of the pectin onto the plant bast fiber. Thus, in order to prevent degradation of the degummed plant bast fiber as a result of acid hydrolysis due to incomplete rinsing, the acidic treatment solution of fungal pectinase can be neutralized immediately following the washing step.

Neutralization is accomplished after agitating the plant bast fiber in the treatment solution for the desired period of time, for example between 10 to 20 minutes as above described, by continuing the agitating with the addition of a suitable neutralizing agent to the treatment solution. Neutralizing the treatment solution is performed by adding to the treatment solution an agent which rapidly raises the pH level of the treatment solution to a level of between about 7.0 to 7.5. A suitable neutralizing agent can be selected from the group consisting of sodium hydroxide, sodium carbonate, sodium bicarbonate, and the like.

The neutralizing agent is added, for example, to the washing machine, as agitation of the degummed plant bast fiber continues immediately following the 10 to 20 minute period during which the plant bast fiber is degummed. After this period of time a selected neutralizing agent is added. The neutralizing step is completed when the treatment solution has reached a pH level between about 7.0 to 7.5. In this manner the agitation of the degummed plant bast fiber in the treatment solution is not interrupted to perform the neutralizing step. The agitation of the degummed plant bast fiber continues in the treatment solution until the treatment solution neutralized, i.e., the pH value of the treatment solution is raised to between about 7.0 to 7.5.

The neutralization step at the above described pH level does not affect the pectin which can be separated from the treatment solution. Thus in order to avoid degradation of the degummed plant bast fiber due to incomplete rinsing, it is preferred that the step of neutralization be carried out. However, it should be understood that the step of neutralization of the treatment solution is not essential when the rinsing step is satisfactorily performed.

Although not considered an essential step to the method of the present invention for degumming the decorticated plant bast fiber, the rinsed, degummed plant bast fiber can be bleached to whiten the fiber. The bleaching is accomplished in a conventional manner. For example, the degummed plant bast fiber can be agitated in a warm, aqueous solution of a chlorine bleach for about 30 seconds to about one minute in a conventional washing apparatus or washing machine, as previously described herein.

After the degummed plant bast fiber is subjected to the bleaching solution for the requisite period of time, the fiber which has been bleached is desirably rinsed with an appropriate amount of a suitable rinsing agent, such as water, to substantially remove any bleaching constituents remaining in contact with the plant fiber. For example, the rinsing is accomplished by rinsing the plant fiber with a suitable rinsing agent, such as water, in a conventional washing apparatus or washing machine, as previously described herein.

Where it is desired to remove the coloring gum that remains on the plant bast fibers after treatment with the acidic solution containing the fungal pectinase, the plant bast fibers with the pectin removed therefrom are removed from the acidic solution and a suitable caustic, such as concentrated (50% by weight) NaOH is added to the acidic solution in a suffient amount to increase the pH to about 11 with 0.3% by weight NaOH in the total solution. The plant bast fibers with the pectin removed therefrom and containing the small percentage of coloring gum is then immersed in the caustic solution and agitated for a period of between about 15 minutes and 60 minutes at a temperature of about 160° F. The caustic solution in removing the coloring gum, changes in color from a substantially clear solution to a solution having a light brown color. This color change is due to the removal of the coloring gums from the decorticated plant bast fibers.

The plant bast fiber with both the pectin and the coloring gum removed therefrom is then removed from the caustic treating solution and rinsed in water at a temperature of between 100° F. and 120° F. for a sufficient period to remove the caustic solution from the fibers. The degummed and decorticated plant bast fiber may be bleached with a chlorine bleach solution as previously described.

The treatment of the plant bast fibers with the pectin removed therefrom in the basic solution at a pH of about 11, in addition to removing the coloring gum from the fibers, stabilizes the surface of the individual fibers.

Where it is desired to recover the pectin from the acidic solution, the plant bast fiber with the pectin removed therefrom is removed from the acidic solution and the pectin may be recovered in a conventional manner from the acidic pectin containing solution.

The following examples are illustrative of the method of the present invention for degumming decorticated bast fiber.

EXAMPLE 1

Eighteen pounds of decorticated ramie bast fiber was washed in 45 gallons of warm tap water containing 8 to 12 ounces (227–340 grams) of a commercially available laundry detergent, the laundry detergent containing an anionic surface active agent. The decorticated ramie bast fiber was washed for about 15 minutes in the detergent solution in a conventional washing machine to remove the water soluble materials in the pectin-containing material surrounding the ramie bast fiber, as well as any extraneous debris present on the fiber.

The washed ramie bast fiber was then rinsed twice with tap water in a conventional washing machine to ensure that any detergent, water soluble material from the pectin-containing material surrounding the ramie bast fiber, and any associated debris were removed from the ramie bast fiber to be degummed.

The washed and rinsed ramie bast fiber was agitated in a conventional washing machine containing 45 galloons of acidified water having a temperature between 60° C. to 65° C., adjusted to a pH of between about 2.5 by the addition of a sufficient amount of hydrochloric acid. One gram (0.04 ounces) of powdered fungal pectinase was added to the solution. Additionally, 5 drops (0.2 ml) of "TRITON X-100", a non-ionic penetrant, was also added to hasten the penetration of the enzyme into the pectin. The ramie bast fiber was treated in this treatment solution for about 15 minutes.

At the conclusion of the 15 minutes in the treatment solution, the ramie bast fiber was separated from the treatment solution and was immediately rinsed with tap water for about 2 minutes in a conventional washing machine. At this point, the degummed ramie bast fiber had a slight tan color. The yield of the degummed ramie bast fiber was about 15½ to about 16 pounds.

To whiten the degummed ramie bast fiber, the fiber was placed in a conventional washing machine in 45 gallons of warm tap water to which about 8 to 12 ounces (227–340 grams) of a conventional chlorine bleach was added to the tap water. The degummed ramie bast fiber was then agitated in the bleaching solution for about 30 seconds to about one minute. The ramie bast fiber was rinsed in a sufficient amount of water in a conventional washing machine to remove any bleaching constituents remaining therewith. The resulting rinsed, bleached ramie bast fiber had a white color.

EXAMPLE 2

The process described above in Example 1 was conducted for 18 lbs. of flax straw which was washed in the laundry detergent as above described. The washed and rinsed flax straw was also agitated in a conventional washing machine which contained 45 gallons of acidified water having a temperature of about 150° F., adjusted to a pH of between about 2.0 to 3.5 by the addition of a sufficient amount of hydrochloric acid. One gram (0.04 ounces) of powdered fungal pectinase was added to the solution. Additionally, 5 drops (0.2 ml) of "TRITON X-100" was added to the solution, as above described in Example 1. The flax straw was treated in this treatment solution for a period of time of about 20 minutes.

At the conclusion of the 20 minutes in the treatment solution, the treatment solution was neutralized while agitation of the degummed flax fibers continued. A sufficient amount of sodium hydroxide was added to the treatment solution to rapidly raise the pH of the treatment solution to a value of between about 7.0 to 7.5. Once this pH value was reached, the neutralization step was completed. Thereafter, the degummed flax fibers were separated, rinsed, bleached, and further rinsed, as above described for the ramie bast fiber.

EXAMPLE 3

1 kilogram of ramie bast fiber was washed in a manner similar to that set forth in Example 1 to remove the water soluble materials in the pectin-containing material surrounding the ramie bast fiber, as well as any extraneous debris present on the fiber. The washed ramie bast fiber was then rinsed with tap water in a conventional washing machine to remove the detergent and water soluble material.

The kilogram of washed and rinsed ramie bast fiber was agitated in a conventional washing machine containing 15 liters of tap water at a temperature of 160° F. 20 ml of concentrated hydrochloric acid (0.13% HCl in total solution) was added to the tap water and 2 ml of TRITON X-100 (0.013% TRITON X-100 in total solution) was also added to the tap water. 10 grams of powdered fungal pectinase (0.07% by weight pectinase in total solution) was also added. The ramie bast fiber was treated in this acidic solution for a period of about 15 minutes.

At the conclusion of the 15 minutes in the treatment solution, the ramie bast fiber was removed from the solution and 100 ml of 50% by weight of sodium hydroxide (0.3% NaOH in total solution) was addded to the treatment solution. The pH of the solution containing the NaOH was about 11. The ramie bast fiber removed from the acidic treatment solution was then added to the modified basic treatment solution having a pH of 11. The solution was at a temperature of about 160° F. and the ramie bast fiber with the pectin removed therefrom was treated in the solution for about 15 minutes.

It was noted that the ramie bast fiber treated with the acidic solution to remove the pectin, had a slight tan color. After treatment in the modified caustic or basic solution, the ramie bast fibers had a white appearance and the slight tan color had been removed.

The ramie bast fiber with the pectin and the coloring gum removed therefrom was removed from the caustic solution and rinsed in tap water at a temperature of about 100° F. and 120° F.

The fibers were then immersed in a warm chlorine bleach solution for about 1 minute. The bleach solution contained 300 ml of commercial bleach in 500 ml of tap water. The solution had a concentration of 0.3% by weight NaOCl. The bleached fibers were then rinsed in tap water and dried in a conventional manner.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise that as specifically illustrated and described.

I claim:

1. A method for degumming decorticated plant bast fiber to remove pectin-containing material and coloring gum therefrom comprising the steps of, treating the plant bast fiber with an aqueous, acidic treatment solution of fungal pectinase for a period of time between about 10 to 20 minutes to degum the plant bast fiber and remove the pectin from the plant bast fiber, maintaining said acid treatment solution at an elevated temperature and at a pH of between 2.0 and 3.5, thereafter treating the plant bast fiber with the pectin removed therefrom with an aqueous basic treatment solution for a period of time between 15 to 60 minutes to remove the coloring gum adhering to the plant bast fiber, and maintaining said aqueous basic treatment solution at an elevated temperature and at a pH of about 11.

2. A method as set forth in claim 1 including, separating said degummed plant bast fiber with the pectin removed therefrom from said aqueous, acidic treatment solution of fungal pectinase and thereafter treating said degummed plant bast fiber with the pectin removed therefrom with said basic treatment solution, 3. A method as set forth in claim 1 including, first washing the decorticated plant bast fiber with a washing solution containing a surface active agent to penetrate said plant bast fiber to remove water soluble material and debris therefrom, and thereafter rinsing the washed plant bast fiber.

4. A method as set forth in claim 1 including, removing said plant bast fiber with the pectin removed therefrom from said aqueous acidic treatment solution, adding to said aqueous acidic treatment solution of fungal pectinase containing said removed pectin a sufficient amount of sodium hydroxide to increase the pH of the acidic treatment solution to about 11.

5. A method as set forth in claim 1 including, removing the plant bast fiber with the pectin removed therefrom from said aqueous acidic treatment of fungal pectinase, and thereafter recovering the pectin from the acidic treatment solution.

6. A method as set forth in claim 1 in which, said fungal pectinase in said acidic treatment solution is an allomelanin obtained from any source of aspergillus niger.

7. A method as set forth in claim 1 in which,
said aqueous, acidic treatment solution of fungal pectinase includes a non-ionic penetrant.

8. A method as set forth in claim 1 in which,
said acidic treatment solution of fungal pectinase includes about 0.13% by weight non-ionic surfactant.

9. A method as set forth in claim 1 including,
providing a sufficient amount of specific fungal pectinase in said acidic treatment solution to remove substantially all of the pectin from the plant bast fiber.

10. A method as set forth in claim 1 which includes,
stabilizing the surface of the individual plant bast fiber in the basic treatment solution.

* * * * *